United States Patent
Mihindukulasooriya et al.

(10) Patent No.: US 11,693,896 B2
(45) Date of Patent: Jul. 4, 2023

(54) NOISE DETECTION IN KNOWLEDGE GRAPHS

(71) Applicant: International Business Machines Corporation, Armonk, NY (US)

(72) Inventors: Nandana Sampath Mihindukulasooriya, Somerville, MA (US); Oktie Hassanzadeh, Port Chester, NY (US); Alfio Massimiliano Gliozzo, Brooklyn, NY (US); Sarthak Dash, Jersey City, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1043 days.

(21) Appl. No.: 16/141,303

(22) Filed: Sep. 25, 2018

(65) Prior Publication Data
US 2020/0097861 A1    Mar. 26, 2020

(51) Int. Cl.
*G06F 16/36* (2019.01)
*G06F 16/28* (2019.01)
*G06F 16/901* (2019.01)

(52) U.S. Cl.
CPC .......... *G06F 16/367* (2019.01); *G06F 16/285* (2019.01); *G06F 16/9024* (2019.01)

(58) Field of Classification Search
CPC .. G06F 16/367; G06F 16/285; G06F 16/9024; G06N 5/022
See application file for complete search history.

(56) References Cited

U.S. PATENT DOCUMENTS

| | | | | |
|---|---|---|---|---|
| 7,730,072 B2* | 6/2010 | Richter | ................. | G06F 16/954 707/748 |
| 9,202,254 B2 | 12/2015 | Rodriguez et al. | | |
| 9,225,822 B2 | 12/2015 | Davis et al. | | |
| 9,479,883 B2 | 10/2016 | Asada et al. | | |
| 10,599,885 B2* | 3/2020 | Galitsky | ............... | G06F 40/216 |
| 10,678,816 B2* | 6/2020 | Peng | ................... | G06F 16/3329 |
| 10,706,841 B2* | 7/2020 | Gruber | .................... | G10L 15/22 |
| 11,080,295 B2* | 8/2021 | Chang | ................... | G06F 16/258 |

(Continued)

OTHER PUBLICATIONS

Gerber, Daniel, et al. "DeFacto—Temporal and Multilingual Deep Fact Validation." Web Semantics: Science, Services and Agents on the World Wide Web 35 (2015) 19 pages.

(Continued)

*Primary Examiner* — Miranda Le
(74) *Attorney, Agent, or Firm* — Amin, Turocy & Watson, LLP

(57) ABSTRACT

Techniques regarding autonomous classification and/or identification of various types of noise comprised within a knowledge graph are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a knowledge extraction component, operatively coupled to the processor, that can classify a type of noise comprised within a knowledge graph. The type of noise can be generated by an information extraction process.

13 Claims, 10 Drawing Sheets

(56) References Cited

U.S. PATENT DOCUMENTS

| | | | | |
|---|---|---|---|---|
| 2007/0198454 | A1* | 8/2007 | Greenblatt | G06F 16/278 |
| 2009/0024590 | A1* | 1/2009 | Sturge | G06F 16/972 |
| | | | | 707/999.102 |
| 2010/0287179 | A1* | 11/2010 | Peoples | G06F 16/9024 |
| | | | | 707/769 |
| 2011/0191276 | A1* | 8/2011 | Cafarella | G06F 16/358 |
| | | | | 707/723 |
| 2012/0158633 | A1* | 6/2012 | Eder | G16H 50/20 |
| | | | | 707/E17.014 |
| 2013/0262361 | A1* | 10/2013 | Arroyo | G06F 16/245 |
| | | | | 706/46 |
| 2015/0178273 | A1* | 6/2015 | Hakkani-Tur | G06F 40/40 |
| | | | | 704/9 |
| 2015/0317302 | A1* | 11/2015 | Liu | G06F 16/90332 |
| | | | | 704/9 |
| 2016/0361041 | A1* | 12/2016 | Barsimantov | A61B 7/00 |
| 2017/0024375 | A1* | 1/2017 | Hakkani-Tur | G10L 15/1822 |
| 2018/0283723 | A1* | 10/2018 | Ock | G05B 15/02 |
| 2018/0300310 | A1* | 10/2018 | Shinn | G06N 5/022 |
| 2019/0122111 | A1* | 4/2019 | Min | G06N 3/0481 |
| 2019/0171944 | A1* | 6/2019 | Lu | G06N 20/00 |
| 2019/0228297 | A1* | 7/2019 | Shen | G06N 3/08 |
| 2019/0370697 | A1* | 12/2019 | Ramachandra Iyer | |
| | | | | G06N 7/005 |
| 2020/0057946 | A1* | 2/2020 | Singaraju | G06N 20/00 |
| 2020/0285983 | A1* | 9/2020 | Bhattacharyya | G06F 16/2474 |
| 2020/0285997 | A1* | 9/2020 | Bhattacharyya | G06N 7/00 |

OTHER PUBLICATIONS

Ballatore, Andrea, et al. "A Survey of Volunteered Open Geo-Knowledge Bases in the Semantic Web." arXiv:1401.2610v1 [cs.DL]. Jan. 12, 2014. 27 pages.

Rashid, Mohammad, et al. "Knowledge Base Quality Assessment Using Temporal Analysis." IOS Press. Mar. 2017. 30 pages.

Anonymous. "A Self-Diagnosing Question Answer System". ip.com. Aug. 17, 2016. 6 pages.

Paulheim, Heiko. "Knowledge Graph Refinement: A Survey of Approaches and Evaluation Methods." IOS Press 2016. 23 pages.

Lui, Shuangyan, et al. "Measuring Accuracy of Triples in Knowledge Graphs." International Conference on Language, Data and Knowledge. (2017). 15 pages.

Socher, Richard, et al. "Reasoning With Neural Tensor Networks for Knowledge Base Completion." Advances in Neural Information Processing Systems 26. (2013). 10 pages.

Bast, Hannah, et al. "Relevance scores for triples from type-like relations." Proceedings of the 38th International ACM SIGIR Conference on Research and Development in Information Retrieval, ACM (2015) 10 pages.

Mell, Peter, et al. "The NIST Definition of Cloud Computing." National Institute of Standards and Technology. Sep. 2011. 7 pages.

Mihindukulasooriya, Nandana, et al. "Towards Comprehensive Noise Detection in Automatically-Created Knowledge Graphs." ISWC 2017. 4 pages.

* cited by examiner

502 →

```
Algorithm : Inconsistent triple detection
    Data: A set of triples, T(subject,relation,object)
    Result: The set of triples with labels, L(t ∈ T,l ∈ {consistent, inconsistent})
 1  L ← ∅;
 2  relationMap ← ∅;
 3  distinctRelations ← getDistinctRelations(T);
 4  foreach relation ∈ distinctRelations do
 5  |    K ← getTopKtriples(T, relation);
 6  |    propMap ← getKGProperty(K.subjects, K.objects);
 7  |    relationMap.put(relation, propMap);
 8  end
 9  foreach t ∈ T do
10  |    sType ← getType(t.subject);
11  |    oType ← getType(t.object);
12  |    prop ← relationMap.get(t.relation).get(sType);
13  |    if (ontoInconsistency(sType, prop, oType)) then
14  |    |    L.add(t, inconsistent);
15  |    else
16  |    |    patternScore ← getScore(sType, prop, oType);
17  |    |    if patternScore>threshold then
18  |    |    |    L.add(t, consistent);
19  |    |    else
20  |    |    |    L.add(t, inconsistent);
21  end
```

Table : Experimental Results

| Category | Configuration | Precision | Recall |
|---|---|---|---|
| Inconsistent triple detection | | 86.84% | 62.26% |
| Generic triple detection | Standford NLP | 85.65% | 100% |
| | Open NLP | 78.16% | 100% |
| | Combined | 98.25% | 100% |

FIG. 5B

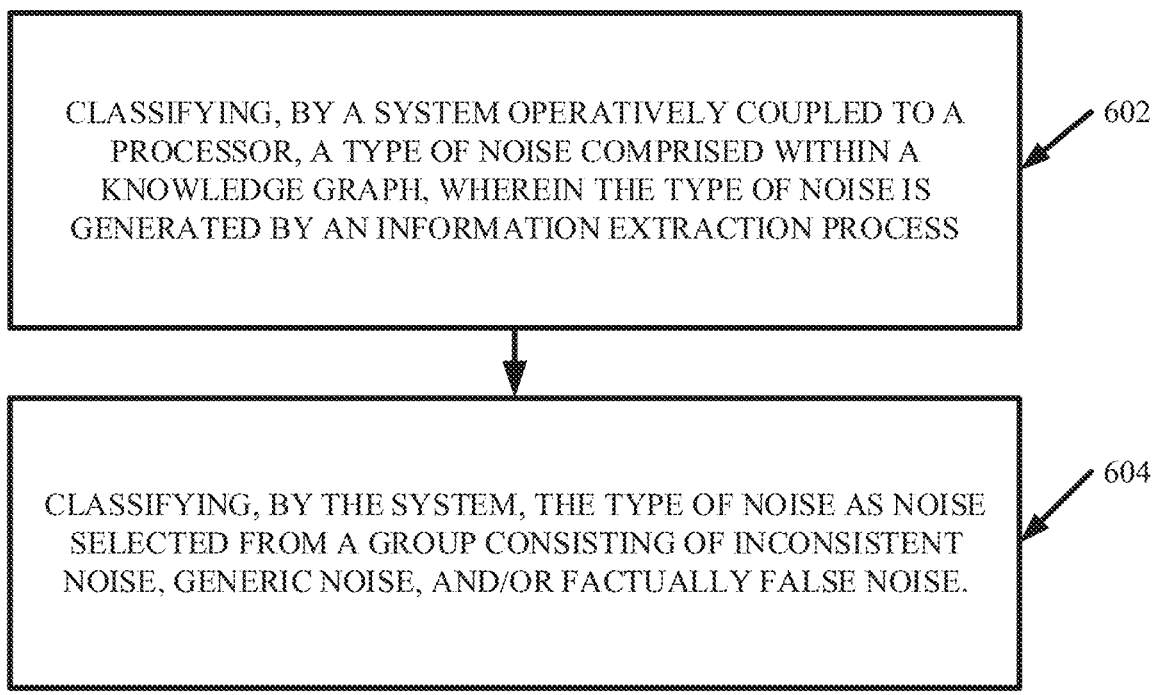

US 11,693,896 B2

NOISE DETECTION IN KNOWLEDGE GRAPHS

BACKGROUND

The subject disclosure relates to detecting noise in knowledge graphs, and more specifically, to an autonomous classification and/or identification of various types of noise comprised within one or more knowledge graphs.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can autonomously classify and/or identify various types of noise comprised within one or more knowledge graphs are described.

According to an embodiment, a system is provided. The system can comprise a memory that can store computer executable components. The system can also comprise a processor, operably coupled to the memory, and that can execute the computer executable components stored in the memory. The computer executable components can comprise a knowledge extraction component, operatively coupled to the processor, that can classify a type of noise comprised within a knowledge graph. The type of noise can be generated by an information extraction process.

According to an embodiment, a computer-implemented method is provided. The computer-implemented method can comprise classifying, by a system operatively coupled to a processor, a type of noise comprised within a knowledge graph. The type of noise can be generated by an information extraction process.

According to an embodiment, a computer program product that can autonomously classify noise in a knowledge graph is provided. The computer program product can comprise a computer readable storage medium having program instructions embodied therewith, the program instructions executable by a processor to cause the processor to classify, by a system operatively coupled to the processor, a type of noise comprised within the knowledge graph. Also, the type of noise is generated by an information extraction process.

BRIEF DESCRIPTION OF THE DRAWINGS

FIG. 5A illustrates a diagram of an example, non-limiting algorithm that can demonstrate the efficacy of a system that can classify and/or identify various types of noise comprised within one or more knowledge graphs, in accordance with one or more embodiments described herein.

FIG. 5B illustrates a diagram of an example, non-limiting table that can demonstrate the efficacy of a system that can classify and/or identify various types of noise comprised within one or more knowledge graphs, in accordance with one or more embodiments described herein.

FIG. 6 illustrates a flow diagram of an example, non-limiting method that can facilitate classifying and/or identifying various types of noise comprised within one or more knowledge graphs, in accordance with one or more embodiments described herein.

DETAILED DESCRIPTION

Figure 1:
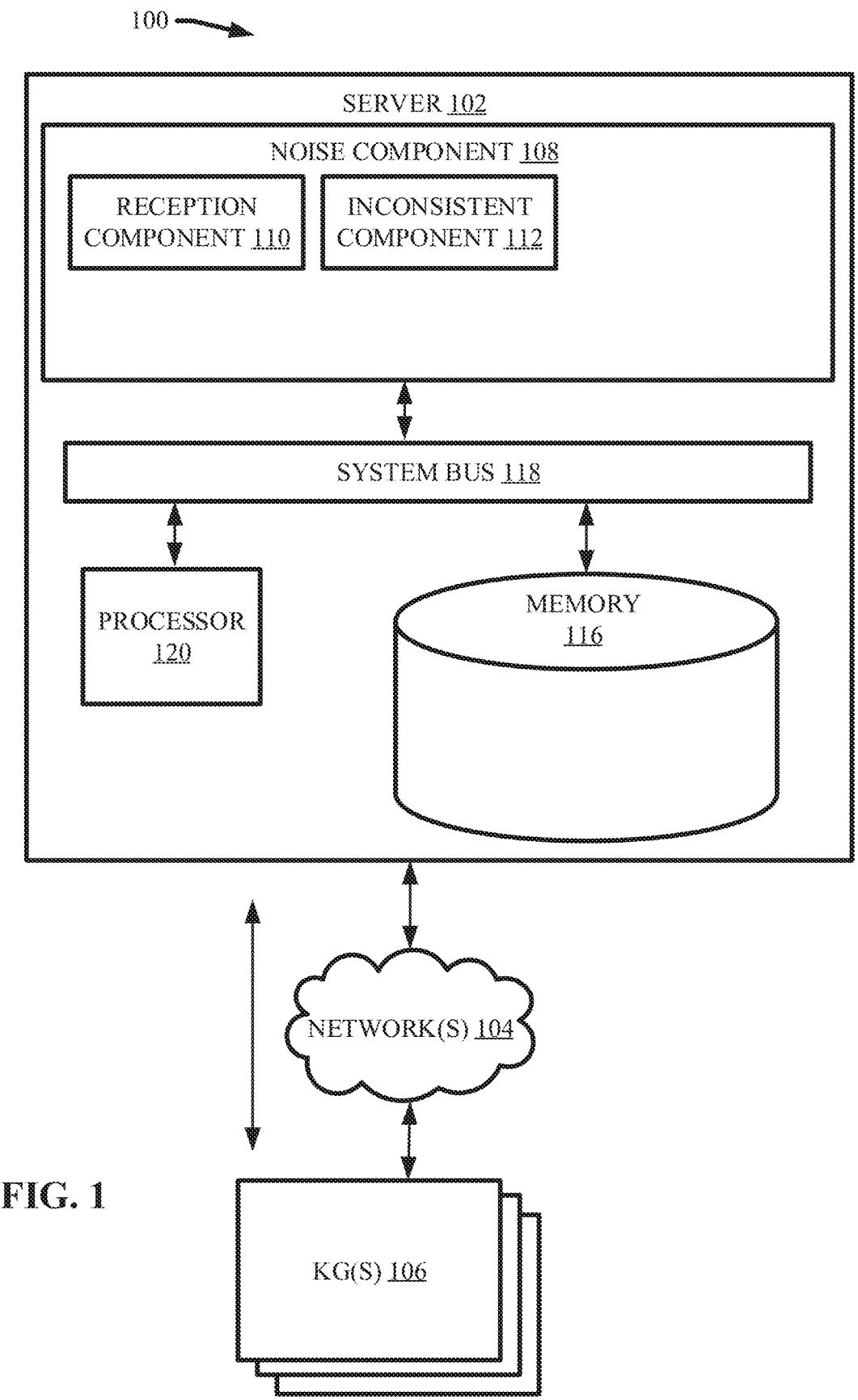
FIG. 1 illustrates a block diagram of an example, non-limiting system that can classify and/or identify various types of noise comprised within one or more knowledge graphs in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Knowledge graphs are important components of many modern artificial intelligence ("AI") and/or cognitive applications. The knowledge graphs are largely constructed from textual corpora using autonomous information extraction techniques, which can populate the knowledge graphs with various types of noise. Thus, noise detection and/or removal can be necessitated to optimize the efficient and/or accuracy of knowledge graphs. However, conventional noise detection techniques focus merely on factually false noise while neglecting to classify, identify, and/or remove other types of noise comprised within knowledge graphs.

Various embodiments of the present invention can be directed to computer processing systems, computer-implemented methods, apparatus and/or computer program products that facilitate the efficient, effective, and autonomous (e.g., without direct human guidance) classification and/or identification of various types of noise comprised within one or more knowledge graphs. In one or more embodiments, noise within one or more knowledge graphs can be classified into one or more types to facilitate a comprehensive noise reduction process. For example, noise within one or more knowledge graphs can be classified as inconsistent noise, generic noise, and/or factually false noise. For instance, inconsistent noise can be identified by ontology mapping one or more subject knowledge graphs with one or more external knowledge graphs and analyzing an axiom of the ontology mapping. In another instance, generic noise can be identified based on the presence of one or more common nouns within one or more knowledge base triples that comprise the knowledge graph. In a further instance, factually false noise can be identified based on a search for evidence in an external knowledge graph that confirms a correctness of the knowledge base triple. In one or more embodiments, the types of noise described herein can be classified and/or identified independently of each other. Alternatively, in one or more embodiments, various types of noise can be classified and/or identified in conjunction with each other.

The computer processing systems, computer-implemented methods, apparatus and/or computer program products employ hardware and/or software to solve problems that are highly technical in nature (e.g., autonomously classifying and/or identifying various types of noise comprised within one or more knowledge graphs), that are not abstract and cannot be performed as a set of mental acts by a human. For example, an individual, or even a plurality of individuals, cannot readily collect, maintain, and/or analyze vast volumes of data as expeditiously and/or efficiently as the various embodiments described herein. For instance, many knowledge graphs comprise large libraries of interconnected data that can be continuously updated; such that even a plurality of individuals could not effectively analyze the knowledge graphs with the efficiency of the various embodiments described herein. Additionally, one or more embodiments described herein can utilize AI technologies that are autonomous in their nature to facilitate determinations and/or predictions that cannot be readily performed by a human.

As used herein, the term "knowledge graph ("KG")" can refer to a network of entities and their interrelations organized in a graph. KGs can treat relationships in a dataset as first-class citizens, thereby enabling connections regarding new data items to be readily formed as the new data items are provided to the KG. Thus, KGs can have a flexible data structure that can readily map to other data formats using known programming tools. Additionally, KGs can be semantic. For example, the meaning of a given data point can be encoded alongside the data in the KG. Thereby, KGs can be self-descriptive and/or can have a natural language-like representation, which can make KGs easy to query and/or explore. Further, KGs can comprise one or more ontologies, which can be based on logical formalisms that can support one or more forms of inference; thereby allowing implicit information to be derived from explicitly asserted data. Also, the one or more ontologies can be extended and/or revised as new data is provided to the KG.

As used herein, the term "information extraction process" can refer to one or more techniques that can transform unstructured information embedded in text into structured data, which can then be used to populate a relational database and/or a KG. For example, information extraction processes can comprise, but are not limited to, the following tasks: named entity recognition, relation extraction, event extraction, and/or template filling. Named entity recognition can comprise identifying each mention of a named entity in a subject text and labeling the entity's type. Relation extraction can comprise identifying and/or classifying semantic relations among recognized entities. Event extraction can comprise identifying, from the subject text, one or more events in which the recognized entities participate (e.g., in accordance with one or more extracted relations). Additionally, template filling can comprise identifying recurring stereotypical situations and/or filling a template slot with appropriate material. In one or more embodiments, information extraction processes can generate structured data, which can be processed by KGs, from one or more text corpora.

As used herein, the term "knowledge base triple" can refer to a format for structuring data to facilitate processing in a relational database and/or a KG. For example, knowledge base triples can present data in the form (subject-predicate-object). For instance, in the knowledge base triple "(IBM®, isA, company)"; "IBM®" can be the subject, "isA" can be the predicate, and "company" can be the object. Thus, a knowledge base triple can describe two entities (e.g., "IBM®" and "company") and their relation to each other (e.g., "isA"). Knowledge base triples can be generated by one or more information extraction processes and/or can be utilized by various AI technologies to form one or more KGs.

FIG. 1 illustrates a block diagram of an example, non-limiting system 100 that can classify and/or identify various types of noise comprised within one or more knowledge graphs in accordance with one or more embodiments described herein. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more KGs 106. The server 102 can comprise knowledge extraction component 108. The knowledge extraction component 108 can further comprise reception component 110 and/or inconsistent component 112. Also, the server 102 can comprise or otherwise be associated with at least one memory 116. The server 102 can further comprise a system bus 118 that can couple to various components such as, but not limited to, the knowledge extraction component 108 and associated components, memory 116 and/or a processor 120. While a server 102 is illustrated in FIG. 1, in other embodiments, multiple devices of various types can be associated with or comprise the features shown in FIG. 1. Further, the server 102 can communicate with a cloud computing environment via the one or more networks 104.

The one or more networks 104 can comprise wired and wireless networks, including, but not limited to, a cellular network, a wide area network (WAN) (e.g., the Internet) or a local area network (LAN). For example, the server 102 can communicate with the one or more KGs 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the knowledge extraction component 108 can be provided on the one or more servers 102, it should be appreciated that the architecture of system 100 is not so limited. For example, the knowledge extraction component 108, or one or more components of knowledge extraction component 108, can be located at another computer device, such as another server device, a client device, etc.

The knowledge extraction component 108 can analyze one or more knowledge base triples of one or more KGs 106 to autonomously classify and/or identify one or more types of noise. The one or more knowledge base triples can be generated from one or more information extraction processes. In one or more embodiments, the one or more information extraction processes can generate the one or more knowledge base triples based on one or more text corpora. In various embodiments, the knowledge extraction component 108 can classify and/or identify knowledge base triples as inconsistent noise, generic noise, factually false noise, and/or a combination thereof.

The reception component 110 can receive knowledge base triples from the one or more KGs 106. For example, the reception component 110 can receive knowledge base triples as data that can represent, correspond to, and/or define the subject knowledge base triples. In one or more embodiments, the one or more KGs 106 can comprise one or more information extraction processes, wherein the reception component 110 can receive one or more knowledge base triples from the one or more information extraction process that comprise one or more KGs 106 subject to analysis by the knowledge extraction component 108. The reception component 110 can be operatively coupled to the one or more KGs 106 and/or can receive the one or more knowledge base triples directly (e.g., via an electrical connection) and/or indirectly (e.g., via the one or more networks 104). Additionally, the reception component 110 can be operatively coupled to the various features of the server 102. For example, the reception component 110 can be operatively coupled to the inconsistent component 112 and/or can send received knowledge base triples to the inconsistent component 112 directly (e.g., via an electrical connection) and/or indirectly (e.g., via the one or more networks 104).

The inconsistent component 112 can classify a type of noise as inconsistent noise. Inconsistent noise can regard one or more knowledge base triples that contradict the domain model they represent. For example, knowledge base triples that are implausible and/or meaningless can be classified as inconsistent noise. For instance, a first exemplary knowledge base triple "(Jim Brown, siblingOf, Astrodome)" can be classified by the inconsistent component 112 as inconsistent noise for not being plausible, at least because a person (e.g., "Jim Brown") can not be the sibling of a building (e.g., "Astrodome"). With regards to the first exemplary knowledge base triple, the "siblingOf" relation can be specified formally (e.g., within the ontology of the one or more KGs 106) to have a range of a person type of the object entity, which can delineate that the object entity is a person, and the person type can be disjointed (e.g., as defined in the ontology of the one or more KGs 106) from a building type of the object entity, which can delineate that the object entity is a building, such that person types are distinct from building types; thereby use of the "siblingOf" relation with a building type of the object (e.g., "Astrodome") results in a logical inconsistency.

The inconsistent component 112 can further identify one or more knowledge base triples as inconsistent noise in accordance with the inconsistent noise classification. In one or more embodiments, the inconsistent component 112 can identify one or more knowledge base triples as inconsistent based by ontology mapping one or more KGs 106 subject to noise analysis by the knowledge extraction component 108 to one or more second KGs 106 (e.g., external KGs 106) and/or analyze one or more axioms of the ontology mapping. For instance, an external KG 106 can be a KG 106 other than the one or more KGs 106 subject to noise analysis by the knowledge extraction component 108. For example, with regards to the first exemplary knowledge base triple, the inconsistent component 112 can map the ontology of a subject KG 106 to the ontology of a second KG 106, which can comprise one or more axioms defining the range of the relation and/or properties of object entities, to identify the first exemplary knowledge base triple as inconsistent noise (e.g., as being implausible). In addition, wherein granular axioms are not present to facilitate inconsistent noise identification (e.g., such as the exemplary reasoning and/or identifying described herein with regards to the first exemplary knowledge base triple); the inconsistent component 112 can perform data profiling to identify one or more patterns in the one or more knowledge base triples comprising the one or more KGs 106, which can facilitate identifying heuristics of inconsistencies. For example, the data profiling can comprise counting the frequency of occurrence of one or more of the subject, predicate, and/or object of the one or more knowledge base triples, and/or the co-occurrence of the knowledge base triples.

Therefore, the inconsistent component 112 can identify one identify one or more knowledge base triples as inconsistent noise in accordance with the inconsistent noise classification by mapping both entities as well as relations to one or more second KGs 106 (e.g., external KGs 106) and/or analyzing: one or more ontological axioms that can define one or more formal conceptualizations (e.g., domain and/or range properties and/or disjoint types), and/or common patterns in data (e.g., the one or more knowledge base triples comprising the one or more KGs 106). A relation mapping can be one-to-one if the relations in the information extraction processes and properties in one or more KGs 106 (e.g., external KGs 106) have similar granularity. For example, the relation "siblingOf" (e.g., a relation extracted by the one or more information extraction processes and comprised within the subject KG 106) can map to "dbo:sibling" (e.g., a property from the one or more external KGs 106); wherein "dbo" can stand for DBpedia ontology, which is an external and publicly available KG 106. Otherwise, the relation mapping can be conditional based on the domain class. For example, the relation "partOfMany" (e.g., a relation extracted by the one or more information extraction processes and comprised within the subject KG 106) can map to "dbo:country" in a "dbo:City" class and/or "dbo:album" in a "dbo:Single" class.

Figure 2:
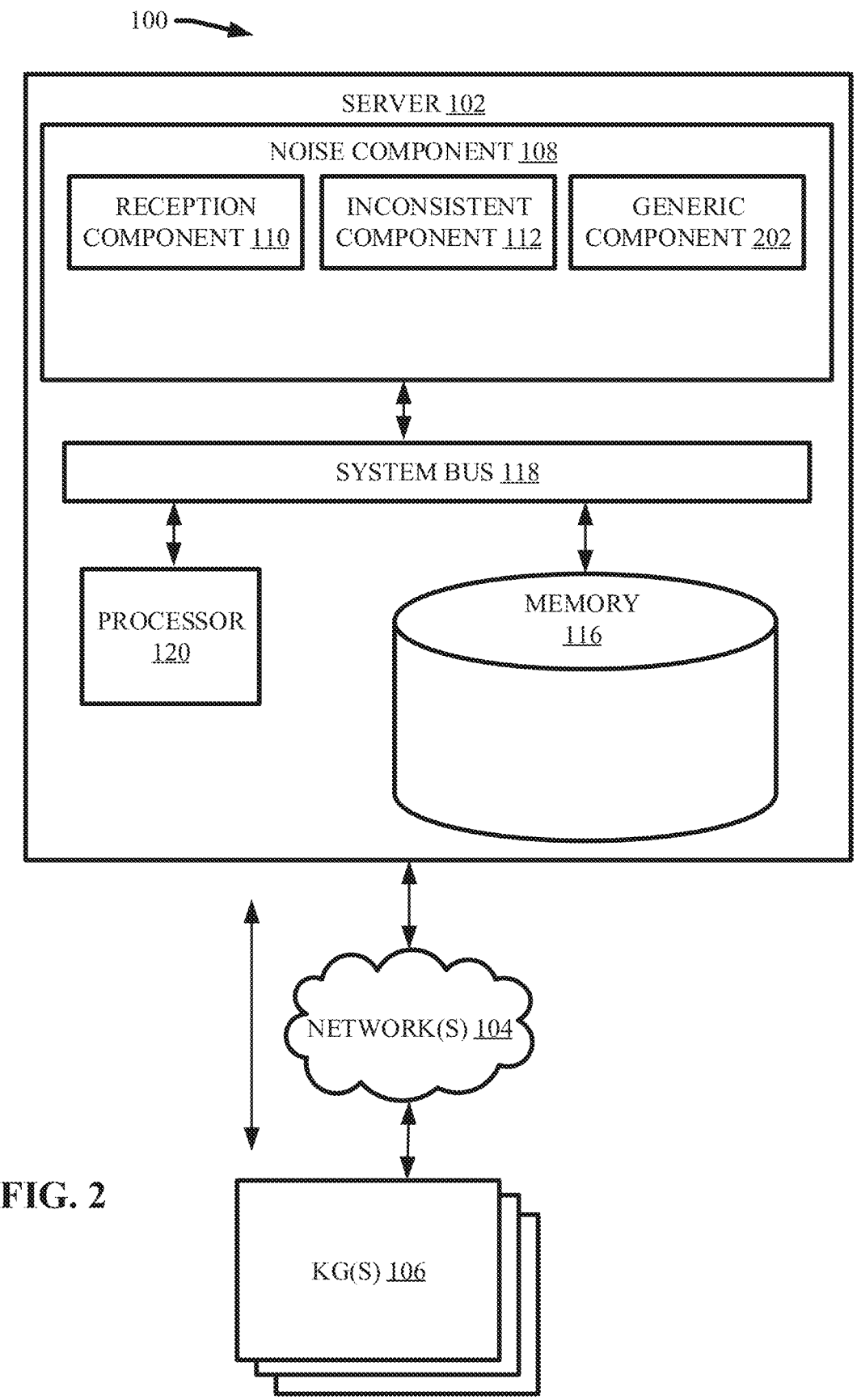
FIG. 2 illustrates a diagram of an example, non-limiting system that can classify and/or identify various types of noise comprised within one or more knowledge graphs in accordance with one or more embodiments described herein.

FIG. 2 illustrates a diagram of the example, non-limiting system 100 further comprising the generic component 202 in accordance with one or more embodiments described herein. Repetitive description of like elements employed in other embodiments described herein is omitted for sake of brevity. The generic component 202 can classify a type of noise as generic noise.

Generic noise can regard one or more knowledge base triples that fail to comprise two specific entities and/or convey little informative value. For example, a second exemplary knowledge base triple "(family, residesIn, New York)" can be classified by the generic component 202 as generic noise. For instance, the second exemplary knowledge base triple comprises a non-specific, generic subject entity (e.g., "family") and thereby provides little informative value. In another example, a third exemplary knowledge base triple "(family, residesIn, city)" can be classified by the generic component 202 as generic noise. For instance, the third exemplary knowledge base triple comprises two non-specific entities: a non-specific, generic subject entity (e.g., "family"); and a non-specific, generic object entity (e.g., "city"). Further, the third exemplary knowledge base triple merely conveys that a family resides in a city, which can also be considered to have little informative value.

The generic component 202 can further identify one or more knowledge base triples as generic noise in accordance with the generic noise classification. In one or more embodiments, the generic component 202 can identify one or more knowledge base triples as generic noise based on whether the subject knowledge base triple comprises one or more common nouns (e.g., nouns that are not proper nouns). For example, the presence of one or more common nouns within a subject knowledge base triple (e.g., as the subject entity and/or the object entity) can indicate that the knowledge base triple is generic noise. The generic component 202 can utilize one or more natural language processing tools to facilitate determining the presence of one or more common nouns comprised within the one or more knowledge base triples. Example natural language processing tools can include, but are not limited to: a named entity recognition tool, a noun phrase extraction tool, a combination thereof, and/or the like. For instance, the natural language processing tool can be Natural Language Toolkit. One of ordinary skill in the art will readily recognize that a variety of natural language processing tools can facilitate identify one or more common nouns within the one or more knowledge base triples. For instance, the one or more natural language processing tools can be utilized by the generic component 202 to perform part-of-speech tagging with regards to the one or more knowledge base triples.

Figure 3:
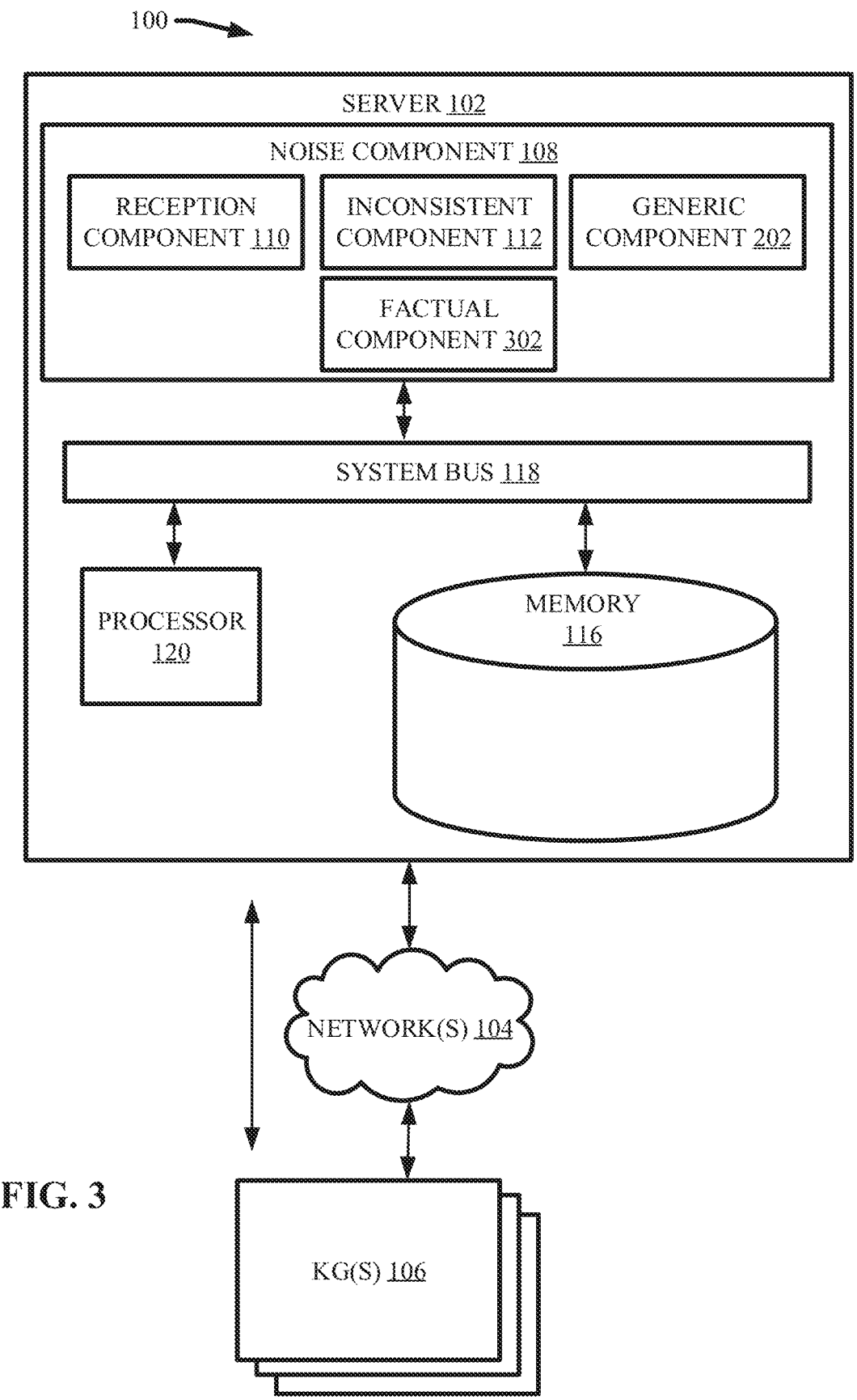
FIG. 3 illustrates a diagram of an example, non-limiting system that can classify and/or identify various types of noise comprised within one or more knowledge graphs in accordance with one or more embodiments described herein.

FIG. 3 illustrates a diagram of the example, non-limiting system 100 further comprising the factual component 302 in accordance with one or more embodiments described herein. Repetitive description of like elements employed in other embodiments described herein is omitted for sake of brevity. The factual component 302 can classify a type of noise as factually false noise.

Factually false noise can regard one or more knowledge base triples that convey incorrect information. For example, the fourth exemplary knowledge base triple "(Boston, capitolOf, USA)" can be classified by the factual component 302 as factually false noise. For instance, Boston is not the capitol of the United States of America.

The factual component 302 can further identify one or more knowledge base triples as factually false based on a search for evidence in one or more second KGs 106 (e.g., one or more external KGs 106) that can confirm a correctness of the one or more knowledge base triples subject to analysis. The factual component 302 can utilize disambiguation and/or relation mapping in accordance with the various embodiments described herein to facilitate determining correctness and/or identifying a knowledge base triple as factually false. For example, the two entities and relation comprising a knowledge base triple can be defined by a function such that a knowledge base triple is factually false if a value of the function is less than a given threshold.

Figure 4A:
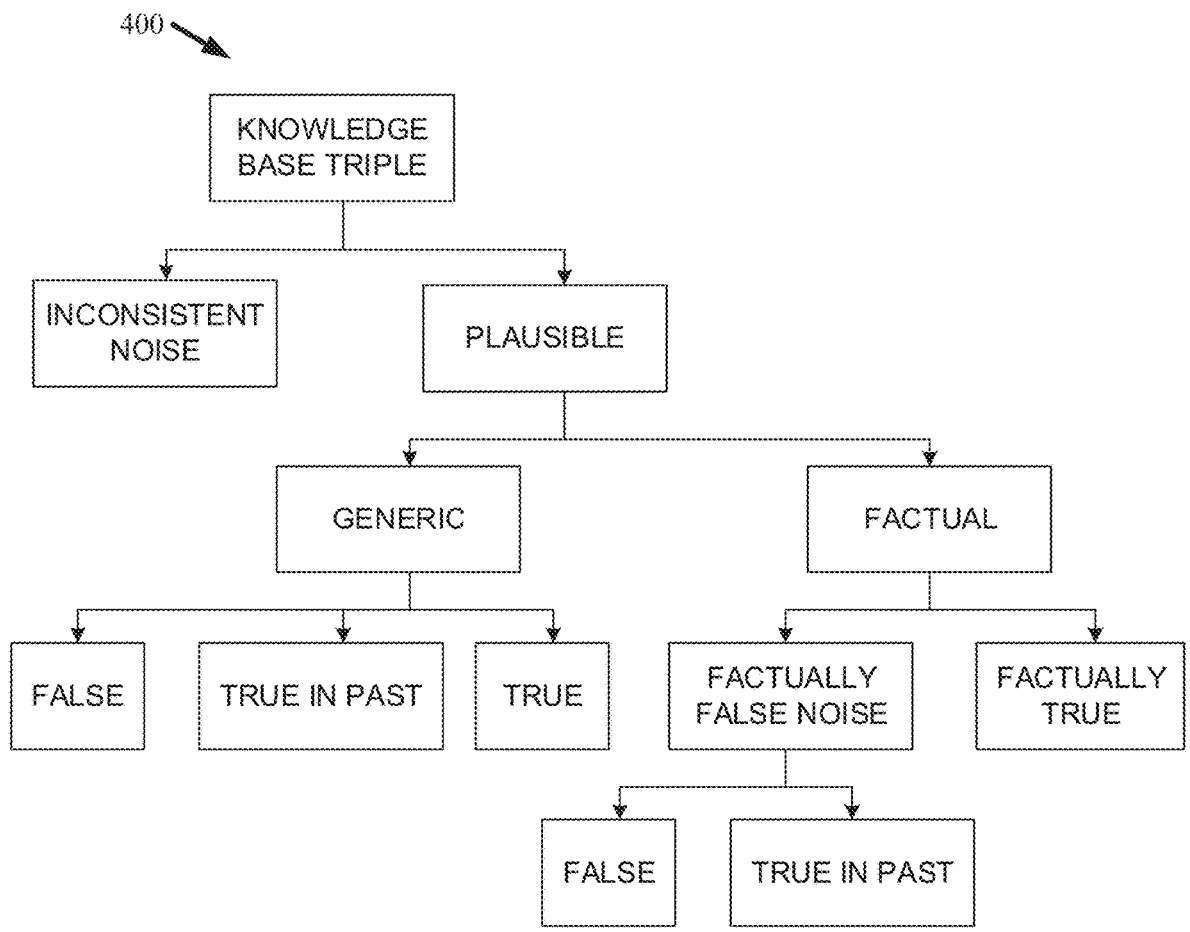
FIG. 4A illustrates a diagram of an example, non-limiting classification architecture that can depict various types of noise that can be classified and/or identified in accordance with one or more embodiments described herein.

FIG. 4A illustrates a diagram of an example, non-limiting classification architecture 400 that can depict various types of noise, which can be classified and/or identified by the system 100 in accordance with one or more embodiments described herein. Repetitive description of like elements employed in other embodiments described herein is omitted for sake of brevity. As shown in FIG. 4A, a given knowledge base triple can be identified (e.g., by the inconsistent component 112) as inconsistent noise or plausible in accordance with the inconsistent noise classification (e.g., as established by the inconsistent component 112). Wherein the knowledge base triple is found to be plausible, the plausible knowledge base triple can be identified (e.g., by the generic component 202) as generic or factual in accordance with the generic noise classification (e.g., as established by the generic component 202). As shown in FIG. 4A, generic noise can comprise base triples that convey false information, base triples that convey information that was true in the past, and/or base triples that convey true information. Wherein the knowledge base triple is found to be factual, the factual knowledge base triple can be identified as factually false noise or factually true in accordance with the factually false noise classification (e.g., as established by the factual component 302). As shown in FIG. 4A, factually false noise can comprise knowledge base triples that convey false information and/or base triples that convey information that was true in the past.

Figure 4B:
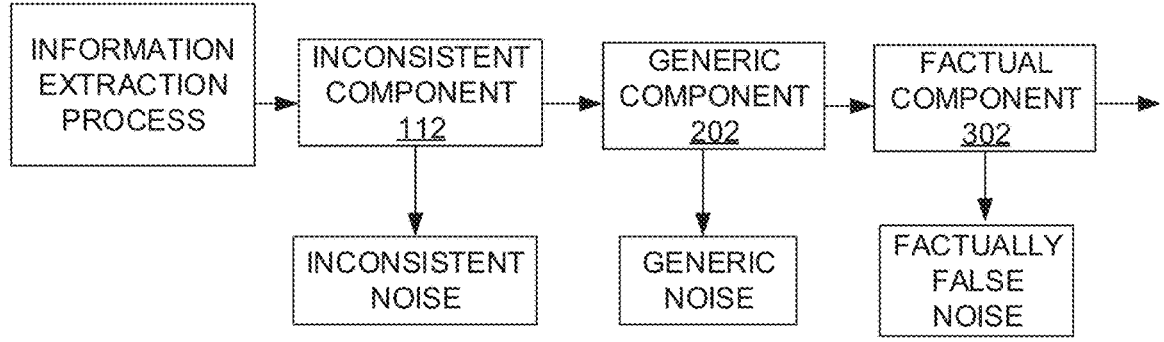
FIG. 4B illustrates a diagram of an example, non-limiting processing flow that can be performed by a system, which can classify and/or identify various types of noise comprised within one or more knowledge graphs, in accordance with one or more embodiments described herein.

FIG. 4B illustrates a diagram of an example, non-limiting processing flow 402 that can depict one or more noise classifications and/or identifications that can be performed by the system 100 in accordance with one or more embodiments. Repetitive description of like elements employed in other embodiments described herein is omitted for sake of brevity. As shown in FIG. 4B, in one or more embodiments, the knowledge extraction component 108 can analyze one or more knowledge base triples to classify and/or identifying a combination of various types of noise.

As shown in FIG. 4B, one or more information extraction process (e.g., comprised within the one or more KGs 106) can generate one or more knowledge base triples (e.g., which can be comprised within one or more KGs 106 subject to analysis) and can send the knowledge base triples to the inconsistent component 112. The inconsistent component 112 can classify inconsistent noise and/or identify the knowledge base triples as either inconsistent noise or plausible knowledge base triples in accordance with the inconsistent noise classification. Knowledge base triples identified as inconsistent noise can be removed from the one or more KGs 106 subject to analysis (e.g., the inconsistent component 112 can send, via, for example, the one or more networks 104, one or more commands and/or recommendations instructing the removal of the one or more knowledge base triples identified as inconsistent noise to the one or more KGs 106). Whereas plausible knowledge base triples can be sent (e.g., by the inconsistent component 112) to the generic component 202.

The generic component 202 can classify generic noise and/or identify the plausible knowledge base triples as generic noise or factual knowledge base triples in accordance with the generic noise classification. Plausible knowledge base triples identified as generic noise can be removed from the one or more KGs 106 subject to analysis (e.g., the generic component 202 can send, via, for example, the one or more networks 104, one or more commands and/or recommendations instructing the removal of the more knowledge base triples identified as generic noise from the one or more KGs 106). Whereas factual knowledge base triples can be sent (e.g., by the generic component 202) to the factual component 302.

The factual component 302 can classify factual noise and/or identify the factual knowledge base triples as factually false noise or factually true knowledge base triples in accordance with the factually false noise classification. Factual knowledge base triples identified as factually false noise can be removed from the one or more KGs 106 subject to analysis (e.g., the factual component 302 can send, via, for example, the one or more networks 104, one or more commands and/or recommendations instructing the removal of the one or more knowledge base triples identified as factually false noise from the one or more KGs 106). Whereas factually true knowledge base triples can remain comprised within the one or more KGs 106 (e.g., the factual component 302 can send, via, for example, the one or more networks 104, one or more commands and/or recommendations to the one or more KGs 106 instructing the retention of one or more knowledge base triples identified as factually true). Thus, in one or more embodiments, the knowledge extraction component 108 can filter the one or more knowledge base triples comprising a given KG 106 such that inconsistent noise, generic noise, and/or factually false noise can be identified to facilitate removal; thereby the given KG 106, once subject to analysis by the knowledge extraction component 108, can substantially comprise knowledge base triples that are plausible, non-generic (e.g., factual), and/or factually true.

FIG. 5A illustrates a diagram of an example, non-limiting algorithm 502 that can exemplify the efficacy of the system 100 in accordance within one or more embodiments described herein. Repetitive description of like elements employed in other embodiments described herein is omitted for sake of brevity. Algorithm 502 was used to analyze 2,342 knowledge base triples comprised within a KG 106. The 2,342 knowledge base triples were also manually-labeled by human annotators to test the efficacy of the system 100. Each knowledge base triple was labelled (e.g., by the system 100 and/or manually) with its type (e.g., inconsistent noise, generic noise, and/or factually false noise) and/or its truth value (e.g., true, false, and/or true in the past).

FIG. 5B illustrates a diagram of an example, non-limiting table 504 that can depict the results of analyzing the 2,342 knowledge base triples described above with the algorithm 502 (e.g., performed by the knowledge extraction component 108) as compared with the human annotators in accordance with one or more embodiments described herein. Repetitive description of like elements employed in other embodiments described herein is omitted for sake of brevity. As shown in table 504, as compared to the human annotators, the autonomous classification and/or identification performed by the knowledge extraction component 108 resulted in a high level of precision.

In one or more embodiments, the knowledge extraction component 108 can further analyze KG 106 embeddings to demote knowledge base triples that are inconsistent with other knowledge base triples, in such a way that knowledge base triples not identified as noise (e.g., inconsistent noise) can be approximately maximally coherent and/or consistent amongst each other. For example, the inconsistent component 112 can learn representations for entities and/or relations by constructing one or more functions that can represent interactions between related entities. Thus, interactions within a set of consistent knowledge base triples (e.g., knowledge base triples identified as plausible) can positively reinforce one another, but not conform with a second knowledge base triple inconsistent with the set, thereby demoting the plausibility score of the second knowledge base triple.

FIG. 6 illustrates a flow diagram of an example, non-limiting method 600 that can facilitate autonomously classify one or more types of noise comprised within one or more KGs 106 in accordance with one or more embodiments described herein. Repetitive description of like elements employed in other embodiments described herein is omitted for sake of brevity.

At 602, the method 600 can comprise classifying (e.g., via the knowledge extraction component 108), by a system 100 operatively coupled to a processor 120, one or more types of noise comprised within one or more KGs 106. The one or more types of noise can be generated by one or more information extraction processes.

At 604, the method 600 can comprise classifying (classifying (e.g., via the knowledge extraction component 108), by the system 100, the one or more types of noise as noise selected from a group consisting of inconsistent noise, generic noise, and/or factually false noise. For example, inconsistent noise can be classified as one or more knowledge base triples that contradict the domain model they represent. For instance, knowledge base triples that are implausible and/or meaningless can be classified as inconsistent noise. In another example, generic noise can be classified as one or more knowledge base triples that comprise one or more common nouns for entities (e.g., a common noun for the subject entity and/or a common noun for the object entity). In a further example, factually false noise can be classified as one or more knowledge base triples that are factually incorrect.

Figure 7:
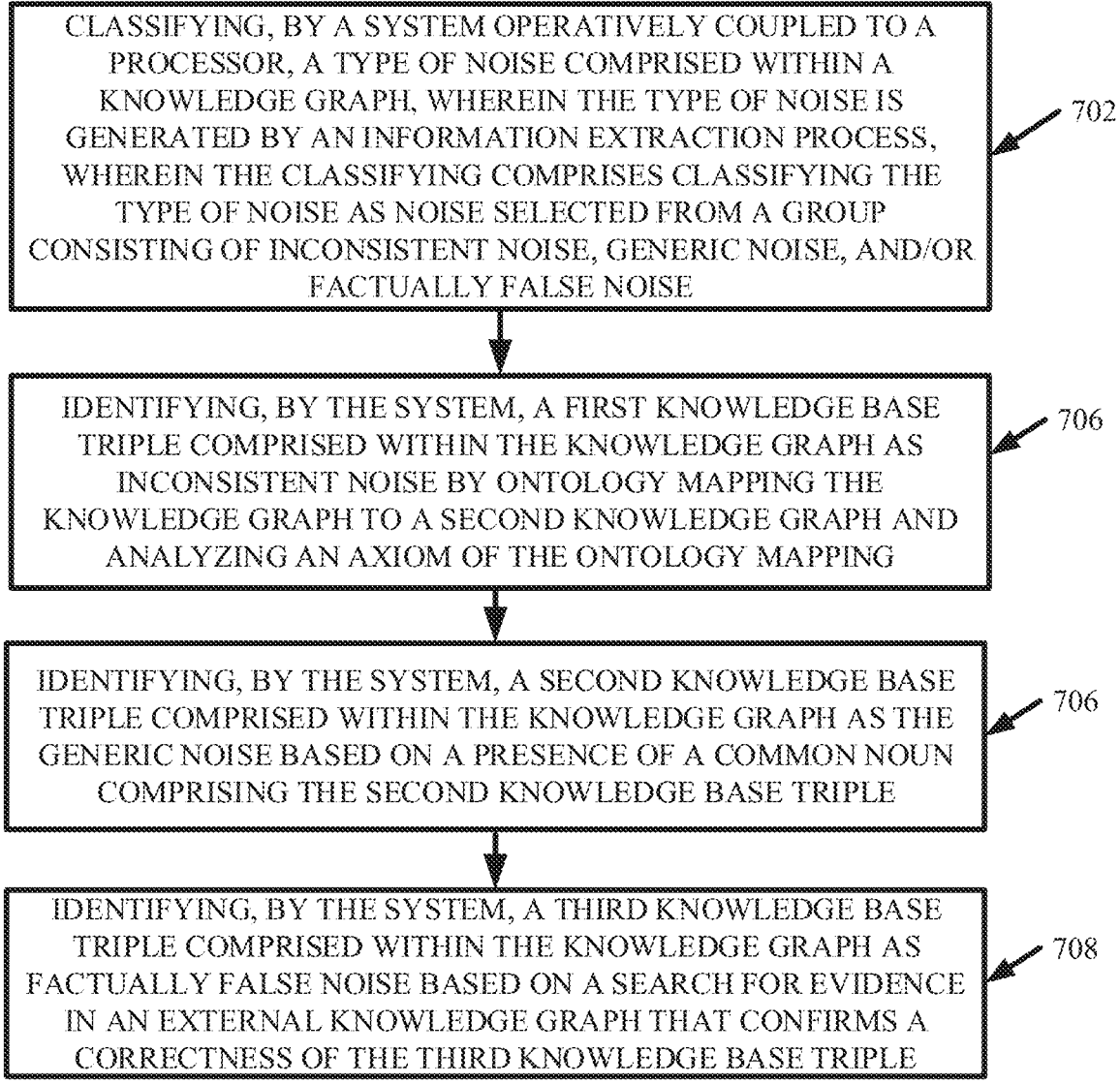
FIG. 7 illustrates a flow diagram of an example, non-limiting method that can facilitate classifying and/or identifying various types of noise comprised within one or more knowledge graphs, in accordance with one or more embodiments described herein.

FIG. 7 illustrates a flow diagram of an example, non-limiting method 700 that can facilitate autonomously classify one or more types of noise comprised within one or more KGs 106 in accordance with one or more embodiments described herein. Repetitive description of like elements employed in other embodiments described herein is omitted for sake of brevity.

At 702, the method 700 can comprise (e.g., via the knowledge extraction component 108) classifying, by a system 100 operatively coupled to a processor 120, one or more types of noise comprised within a KG 106. The one or more types of noise can be generated by an information extraction process. Further, the classifying at 702 can comprise classifying the one or more types of noise as noise selected from a group consisting of inconsistent noise, generic noise, and/or factually false noise. For example, inconsistent noise can be classified as one or more knowledge base triples that contradict the domain model they represent. For instance, knowledge base triples that are implausible and/or meaningless can be classified as inconsistent noise. In another example, generic noise can be classified as one or more knowledge base triples that comprise one or more common nouns for entities (e.g., a common noun for the subject entity and/or a common noun for the object entity). In a further example, factually false noise can be classified as one or more knowledge base triples that are factually incorrect.

At 704, the method 700 can comprise (e.g., via the inconsistent component 112) identifying, by the system 100, one or more first knowledge base triples comprised within the KG 106 as inconsistent noise by ontology mapping the KG 106 to one or more second KGs 106 and analyzing one or more axioms of the ontology mapping. For example, the identifying at 704 can be performed in accordance with the inconsistent noise classification performed at 702.

At 706, the method 700 can comprise (e.g., via the generic component 202) identifying, by the system 100, one or more second knowledge base triples comprised within the KG 106 as generic noise based a presence of one or more common nouns comprising the one or more second knowledge base triples. For example, the identifying at 706 can be performed in accordance with the generic noise classification performed at 702.

AT 708, the method 700 can comprise (e.g., via the factual component 302) identifying, by the system 100, one or more third knowledge base triples comprised within the KG 106 as factually false noise based on a search for evidence in one or more external KG 106 that can confirm a correctness of the one or more third knowledge base triples.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
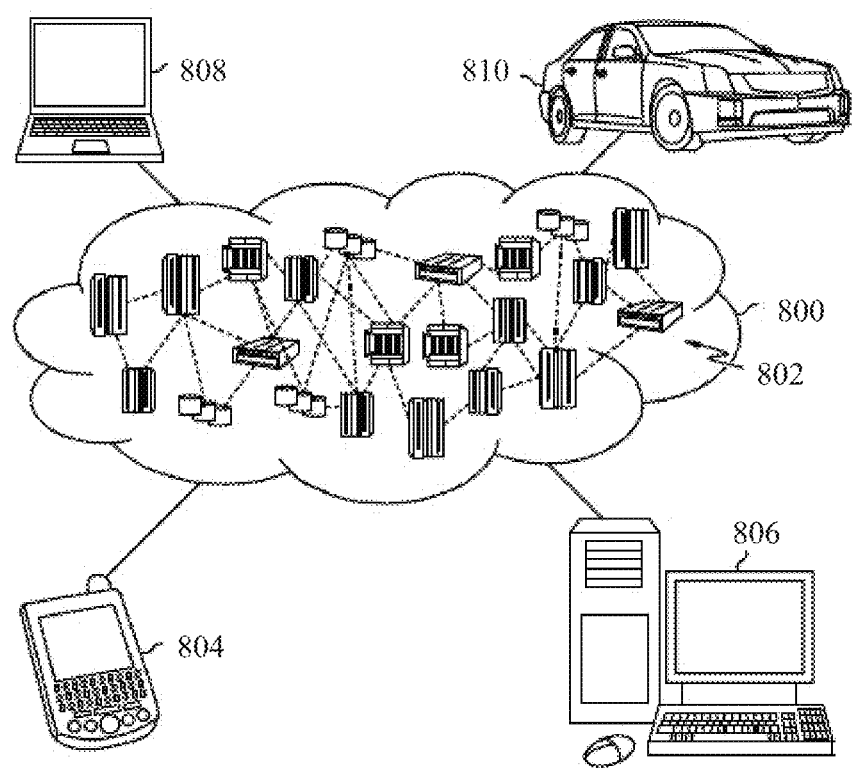
FIG. 8 depicts a cloud computing environment in accordance with one or more embodiments described herein.

Referring now to FIG. 8, illustrative cloud computing environment 800 is depicted. Repetitive description of like elements employed in other embodiments described herein is omitted for sake of brevity. As shown, cloud computing environment 800 includes one or more cloud computing nodes 802 with which local computing devices used by cloud consumers, such as, for example, personal digital assistant (PDA) or cellular telephone 804, desktop computer 806, laptop computer 808, and/or automobile computer system 810 may communicate. Nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804-810 shown in FIG. 8 are intended to be illustrative only and that computing nodes 802 and cloud computing environment 800 can communicate with any type of computerized device over any type of network and/or network addressable connection (e.g., using a web browser).

Figure 9:
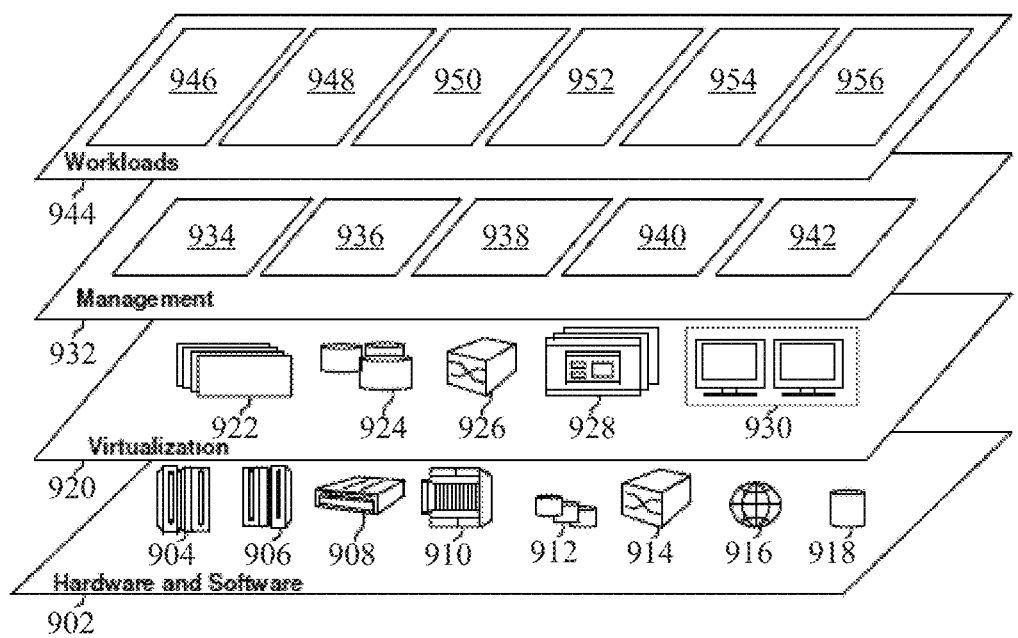
FIG. 9 depicts abstraction model layers in accordance with one or more embodiments described herein.

Referring now to FIG. 9, a set of functional abstraction layers provided by cloud computing environment 800 (FIG. 8) is shown. Repetitive description of like elements employed in other embodiments described herein is omitted for sake of brevity. It should be understood in advance that the components, layers, and functions shown in FIG. 9 are intended to be illustrative only and embodiments of the invention are not limited thereto. As depicted, the following layers and corresponding functions are provided.

Hardware and software layer 902 includes hardware and software components. Examples of hardware components include: mainframes 904; RISC (Reduced Instruction Set Computer) architecture based servers 906; servers 908; blade servers 910; storage devices 912; and networks and networking components 914. In some embodiments, software components include network application server software 916 and database software 918.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 932 may provide the functions described below. Resource provisioning 934 provides dynamic procurement of computing resources and other resources that are utilized to perform tasks within the cloud computing environment. Metering and Pricing 936 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 938 provides access to the cloud computing environment for consumers and system administrators. Service level management 940 provides cloud computing resource allocation and management such that required service levels are met. Service Level Agreement (SLA) planning and fulfillment 942 provide pre-arrangement for, and procurement of, cloud computing resources for which a future requirement is anticipated in accordance with an SLA.

Workloads layer 944 provides examples of functionality for which the cloud computing environment may be utilized. Examples of workloads and functions which may be provided from this layer include: mapping and navigation 946; software development and lifecycle management 948; virtual classroom education delivery 950; data analytics processing 952; transaction processing 954; and noise detection 956. Various embodiments of the present invention can utilize the cloud computing environment described with reference to FIGS. 8 and 9 to classify and/or identify various types of noise comprised within one or more knowledge graphs.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 10:
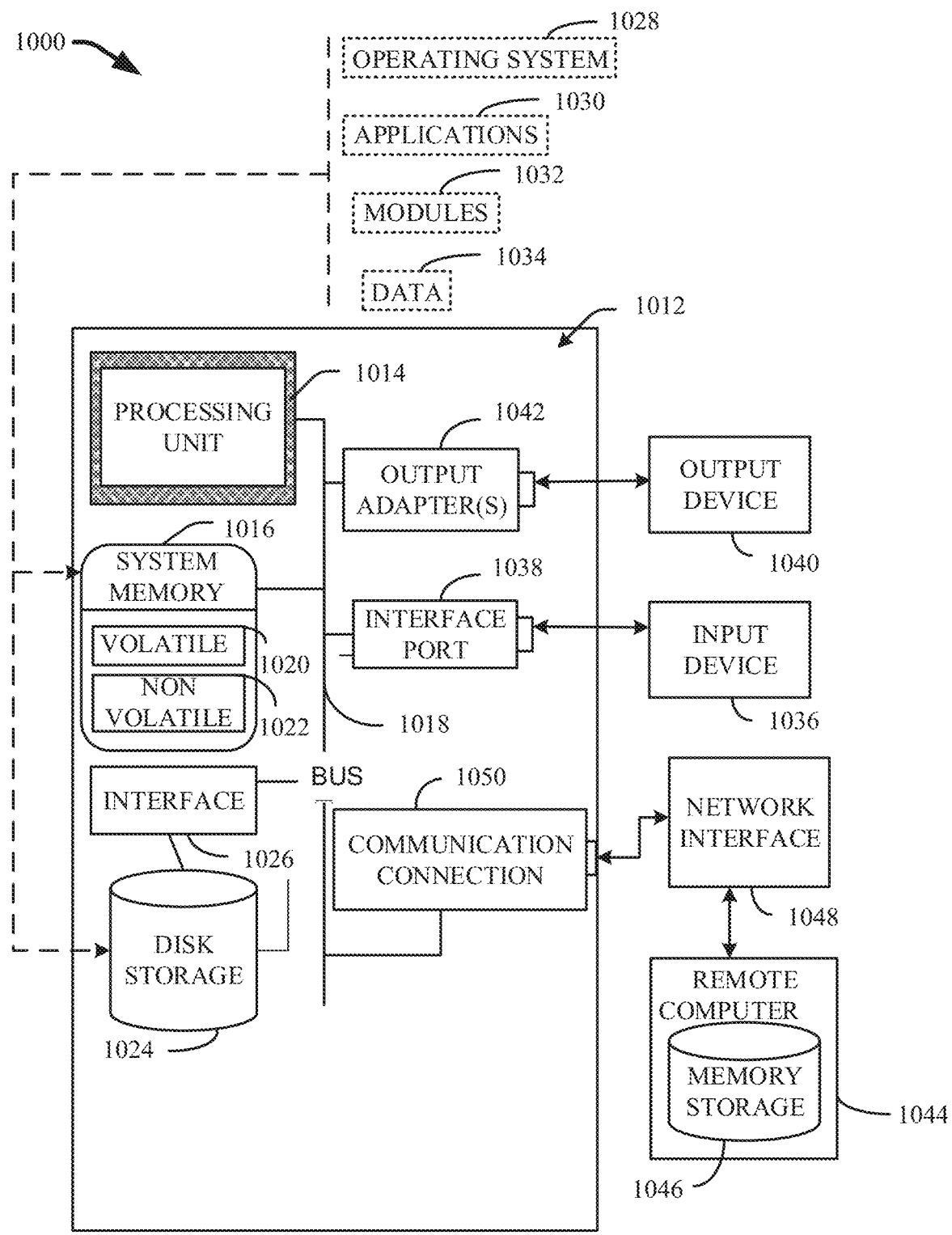
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   a knowledge extraction component, operatively coupled to the processor, that:
   selects between inconsistent noise, generic noise and factually false noise as a type of noise comprised within a knowledge graph;
   autonomously, employing computer-based artificial intelligence, classifies the type of noise comprised within the knowledge graph, wherein the type of noise is generated by an information extraction process; and
   a generic component, operatively coupled to the processor, that identifies a knowledge base triple comprised within the knowledge graph as generic noise based on a presence of a common noun comprising the knowledge base triple, and wherein the generic component determines the knowledge base triple comprises the common noun using a natural language processing tool to perform part-of-speech tagging.

2. The system of claim 1, wherein the computer executable components further comprise:
   an inconsistent component, operatively coupled to the processor, that identifies a knowledge base triple comprised within the knowledge graph as inconsistent noise by ontology mapping the knowledge graph to a second knowledge graph and analyzing an axiom of the ontology mapping.

3. The system of claim 2, wherein the axiom defines a formal conceptualization selected from a group consisting of a domain type of the knowledge graph and a range type of the knowledge graph.

4. The system of claim 3, wherein the inconsistent component analyzes a plurality of axioms of the ontology mapping, wherein the axiom is from the plurality of axioms, and wherein a second axiom from the plurality of axioms defines a common pattern.

5. The system of claim 1, wherein the computer executable components further comprise:
   a factual component, operatively coupled to the processor, that identifies a knowledge base triple comprised within the knowledge graph as factually false noise based on a search for evidence in a second knowledge graph that confirms a correctness of the knowledge base triple.

6. The system of claim 5, wherein the factual component uses a disambiguation technique and a relation mapping technique to perform the search.

7. A computer-implemented method, comprising:
   a processor;
   selecting, by a system operatively coupled to the processor, between inconsistent noise, generic noise and factually false noise as a type of noise comprised within a knowledge graph;
   autonomously classifying, by the system, employing computer-based artificial intelligence, the type of noise comprised within the knowledge graph, wherein the type of noise is generated by an information extraction process; and
   identifying, by the system, a second knowledge base triple comprised within the knowledge graph as the generic noise based on a presence of a common noun comprising the second knowledge base triple; and determining, by the system, the knowledge base triple comprises the common noun using a natural language processing tool to perform part-of-speech tagging.

8. The computer-implemented method of claim 7, further comprising:
identifying, by the system, a first knowledge base triple comprised within the knowledge graph as the inconsistent noise by ontology mapping the knowledge graph to a second knowledge graph and analyzing an axiom of the ontology mapping.

9. The computer-implemented method of claim 8, further comprising:
identifying, by the system, a third knowledge base triple comprised within the knowledge graph as the factually false noise based on a search for evidence in an external knowledge graph that confirms a correctness of the third knowledge base triple.

10. A computer program product that autonomously classifies noise in a knowledge graph, the computer program product comprising a computer readable storage medium having program instructions embodied therewith, the program instructions executable by a processor to cause the processor to:
select, by the processor, between a plurality of different types of noise;
autonomously classify, by the processor, employing computer-based artificial intelligence, a type of noise from the different types of noise selected from a group consisting of inconsistent noise, generic noise, and factually false noise, wherein the type of noise is comprised within the knowledge graph, and wherein the type of noise is generated by an information extraction process; and
identify, by the processor, a second knowledge base triple comprised within the knowledge graph as the generic noise based on a presence of a common noun comprising the second knowledge base triple; and
determining, by the processor, the knowledge base triple comprises the common noun using a natural language processing tool to perform part-of-speech tagging.

11. The computer program product of claim 10, wherein the program instructions further cause the processor to:
identify, by the processor, a first knowledge base triple comprised within the knowledge graph as the inconsistent noise by ontology mapping the knowledge graph to a second knowledge graph and analyzing an axiom of the ontology mapping.

12. The computer program product of claim 11, wherein the ontology mapping is performed in a cloud computing environment.

13. The computer program product of claim 10, wherein the program instructions further cause the processor to:
identify, by the processor, a third knowledge base triple comprised within the knowledge graph as the factually false noise based on a search for evidence in an external knowledge graph that confirms a correctness of the knowledge base triple.

* * * * *